No. 652,491. Patented June 26, 1900.
A. N. SHARPES.
BICYCLE BRAKE.
(Application filed Feb. 12, 1900.)
(No Model.)
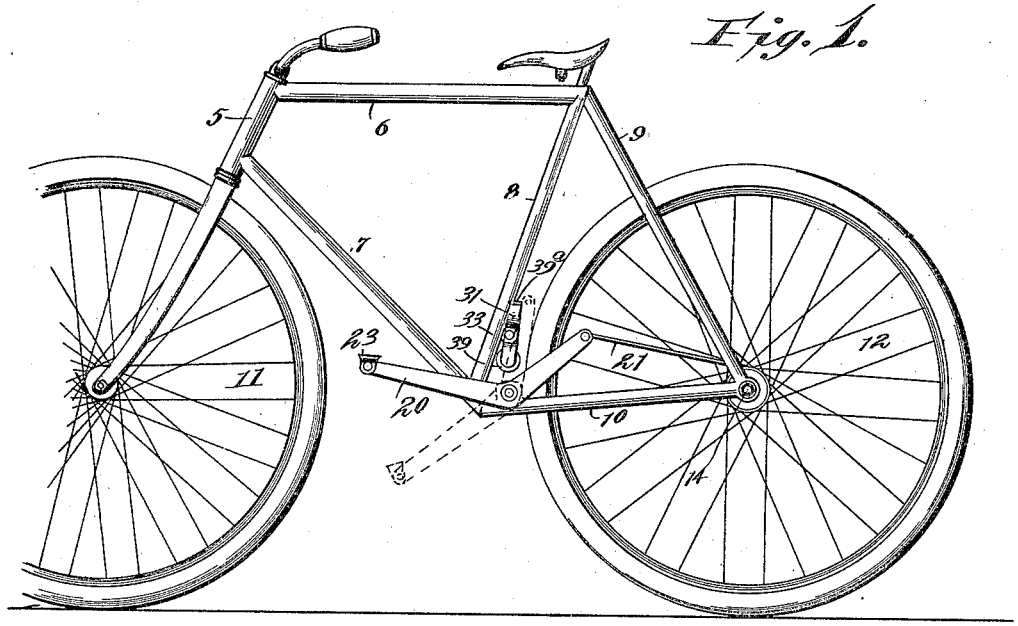
Fig. 1.
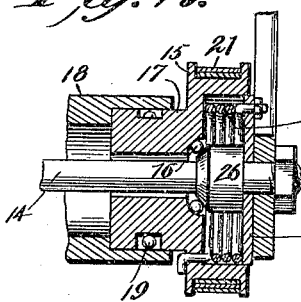
Fig. 2.
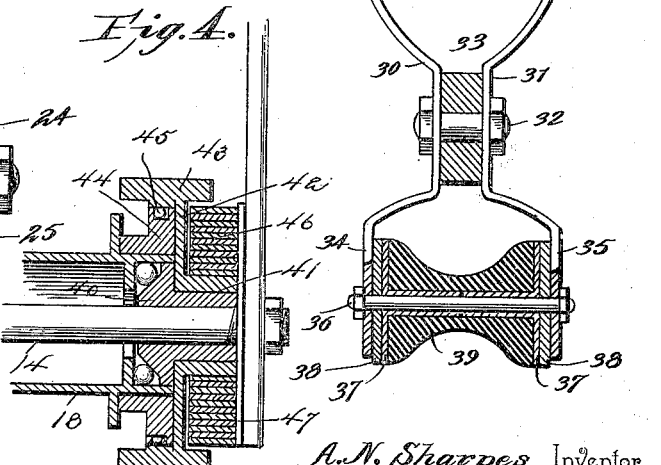
Fig. 4.
Fig. 3.
Witnesses
A. N. Sharpes, Inventor
By his Attorneys,

United States Patent Office.

AMOS N. SHARPES, OF GRAYMONT, ILLINOIS.

BICYCLE-BRAKE.

SPECIFICATION forming part of Letters Patent No. 652,491, dated June 26, 1900.

Application filed February 12, 1900. Serial No. 4,965. (No model.)

*To all whom it may concern:*

Be it known that I, AMOS N. SHARPES, a citizen of the United States, residing at Graymont, in the county of Livingston and State of Illinois, have invented a new and useful Bicycle Propelling and Brake Mechanism, of which the following is a specification.

This invention relates to bicycles in general, and more particularly to the propelling and brake mechanism thereof; and the object of the invention is to provide a construction in which the drive-wheel is operated by means of rock-levers provided with pedals and in which when the levers are moved to the proper points they will operate the brake mechanism.

In the drawings forming a portion of this specification and in which similar numerals of reference designate like and corresponding parts in the several views, Figure 1 is a side elevation of a bicycle equipped with driving mechanism and brake mechanism of the present invention. Fig. 2 is a central section through a portion of the rear hub and showing the ratchet mechanism connected therewith. Fig. 3 is a central section taken through the brake and showing portions of the supporting-arms thereof in elevation. Fig. 4 is a view similar to Fig. 2 and showing a different form of ratchet mechanism.

Referring now to the drawings, the present invention is shown applied to a bicycle comprising a frame which includes a head 5, a top bar 6, a bottom bar 7, a seat-tube 8, rear forks 9, and tie-rods 10, which frame is provided with the front wheel 11 and the rear wheel 12 and also with the usual form of saddle and handle-bar. The rear wheel 12 is mounted upon an axle 14 between the rear ends of the tie-rods and the fork sides, and upon this axle 14 is mounted a drum 15, having ball-bearings 16 upon the axle, this drum 15 having a hub 17, which enters the hub 18 of the rear wheel. The hub 17 within the hub 18 is provided with a ratchet mechanism 19, including balls or rollers disposed in tapered slots in the form of what is commonly known as a "roller-ratchet." This ratchet mechanism is so disposed that when the drum 15 is turned forwardly the hub 18, and therewith the rear wheel, will be correspondingly moved, while the drum may be operated in a reverse direction independently of the hub 18. One of these drums 15 is disposed at each end of the axle 14, and in order to rotate the drums forwardly rock-levers 20 are pivoted adjacent the usual location of the crank-hanger of the frame and have their rear ends connected with the drums 15 by means of straps 21, which are wound upon the drum and are attached thereto at their extremities. The opposite ends of the levers 20 are provided with pedals 23, and thus if the pedals be pressed the straps 21 will be drawn to unwind them from the drums, with the result that the drum will be rotated forwardly and will correspondingly move the rear wheel. When the foot of the rider is raised, the levers are correspondingly moved by means of helical springs 24 within the inclosures of the outer ends of the drums 15, each of these springs having one end secured to the drum and its opposite end secured to an adjacent point of the frame of the bicycle or to a washer 25, clamped between the shoulder 26 of the axle and the adjacent portion of the frame. With this structure it will be seen that the feet of the rider may be operated independently or simultaneously to operate the drums to correspondingly move the wheel.

The brake mechanism is mounted upon the seat-tube 8 and comprises two arms 30 and 31, which are pivotally connected by means of a bolt 32, which is passed through the arms and through a lug 33 upon the rear of the seat-post. These arms at one end are bent outwardly and then forwardly and parallel, as shown at 34 and 35, and in these last-named portions are formed alining perforations, in which is disposed an axle-bolt 36. This bolt 36 has a two-part metallic spool 37 mounted thereon and separated from the arms 34 and 35 by washers 38. A grooved roller 39 is mounted upon the metallic spool 37, this roller being of rubber or other suitable material for direct engagement with the periphery of the tire. The opposite ends of the plates 30 and 31 are extended in the opposite directions from the arms 34 and 35 and are curved outwardly to receive the seat-tube 8 between them when the brake is moved on the pivot-bolt, and the extremities of these portions are bent in opposite directions to lie in a common plane, these last-named portions being shown at 39ª and lying in the path of excessive movement of the levers 20. With the above construction it will be seen that as the levers 20 are normally operated their rear ends will not engage the portions 39ª; but when they are pressed downwardly farther than is usual their rear ends will engage these portions and will rock the plates 30 and 31 upon the pivot-bolt to throw the rubber roller 39 against the rear wheel and stop the bicycle.

By forming the metallic spool 37 of two parts it will be seen that the various elements of the structure may be quickly and easily assembled, and it will be readily understood that when desired the specific structure shown may be changed without departing from the spirit of the invention.

In Fig. 4 of the drawings is shown a different form of the ratchet mechanism and the preferred form. In this structure the wheel-hub 18 has a bearing-cone 40, having an extended base, which lies between the end of the hub and the adjacent rear-fork side. Upon this base is rotatably mounted a ring 41, having a radial flange 42, which carries a drum 43, which carries the strap 21. The drum 43 extends over the adjacent end of the wheel-hub and has a clutch element on its inner face, which coöperates with a second element 44 upon the end of the wheel-hub. Clutch balls or rollers 45 are disposed between these two elements and in operative relation thereto. A spiral spring 46 is mounted upon the ring 41 and has one end attached thereto, the other end of the spring being attached to a disk 47, which is clamped between the bearing-cone and the adjacent rear-fork side.

What is claimed is—

1. A brake comprising two plates separated by an interspace to receive a supporting-lug, a pivot-pin connecting the plates, and adapted for engagement with the supporting-lug, a bolt passed through the plates at one end thereof, a two-part spool mounted upon the bolt between the plates and adapted for movement toward each other under the influence of the bolt, and a rubber roller mounted upon the spool and adapted for compression longitudinally to expand radially when the bolt is operated to move the parts of the spool toward each other, the opposite ends of the plates being bent outwardly for engagement to move the plates on their pivot.

2. A brake comprising plates having perforations adjacent their ends, a spindle mounted in the perforations, a two-part metallic spool rotatably mounted upon the spindle, a grooved rubber roller fixed upon the spool, and a pivot carried by the plates, the extremities of the plates being bent outwardly in an opposite direction for engagement to operate the brake.

In testimony that I claim the foregoing as my own I have hereto affixed my signature in the presence of two witnesses.

AMOS N. SHARPES.

Witnesses:
E. F. PIERCE,
J. H. NASER.